United States Patent
Armitage et al.

(10) Patent No.: US 8,139,810 B2
(45) Date of Patent: Mar. 20, 2012

(54) MOTORCYCLE SPEAKER SYSTEM

(75) Inventors: Mark J. Armitage, Taylorsville, KY (US); Jonathan C. Harris, Wauwatosa, WI (US); Robert Hazelwood, Amesbury, MA (US); Scott Hein, Plymouth, WI (US); Benjamin H. Hodge, IV, Milwaukee, WI (US); William N. House, Falls of Rough, KY (US); Thomas E. Strunsee, Waukesha, WI (US)

(73) Assignees: Harley-Davidson Motor Company Group, LLC, Milwaukee, WI (US); Radio Sound, Inc., Lousville, KY (US)

( * ) Notice: Subject to any disclaimer, the term of this patent is extended or adjusted under 35 U.S.C. 154(b) by 0 days.

(21) Appl. No.: 12/844,634

(22) Filed: Jul. 27, 2010

(65) Prior Publication Data
US 2012/0025486 A1   Feb. 2, 2012

(51) Int. Cl.
*H04R 1/02* (2006.01)
*H04B 1/00* (2006.01)

(52) U.S. Cl. .................................. 381/389; 381/86
(58) Field of Classification Search ............ 381/86, 381/389
See application file for complete search history.

(56) References Cited

U.S. PATENT DOCUMENTS

| | | |
|---|---|---|
| 2,490,563 A | 12/1949 | Van Castle |
| 3,580,988 A | 5/1971 | Orlowski et al. |
| D254,611 S | 4/1980 | Linto |
| 4,473,251 A | 9/1984 | Murayama |
| 4,600,208 A * | 7/1986 | Morishima ............ 381/86 |
| 4,830,134 A | 5/1989 | Hashimoto |
| D304,033 S | 10/1989 | Villanueva et al. |
| 4,915,187 A | 4/1990 | Nakashima et al. |
| 5,001,779 A | 3/1991 | Eggert et al. |
| 5,012,890 A | 5/1991 | Nagi et al. |
| 5,025,883 A | 6/1991 | Morinaka et al. |
| 5,109,422 A | 4/1992 | Furukawa |
| 5,109,942 A | 5/1992 | Akimori et al. |
| D376,150 S | 12/1996 | Pesce |
| D384,076 S | 9/1997 | Lazzeroni et al. |
| 5,771,305 A | 6/1998 | Davis |
| 5,894,810 A | 4/1999 | Orr |

(Continued)

FOREIGN PATENT DOCUMENTS
CN    201116146 Y    9/2008
(Continued)

OTHER PUBLICATIONS

Admitted Prior Art—Harley-Davidson Advanced Audio Package. On sale in the U.S. more than one year prior to Jul. 27, 2010. Statement of Relevance and installation instructions attached.

*Primary Examiner* — Brian Ensey
(74) *Attorney, Agent, or Firm* — Michael Best & Friedrich LLP

(57) ABSTRACT

A motorcycle having an open-air cockpit area and a seat configured to receive a rider and position the rider within the open-air cockpit area. A luggage container defines a substantially enclosed cargo volume, and the luggage container is configured to open to provide selective access to the cargo volume. A speaker is configured to output sound in response to signals from a source. A speaker enclosure at least partially encloses the speaker. A bass-reflex passage couples an interior space of the sparker enclosure and the cargo volume of the luggage container.

23 Claims, 8 Drawing Sheets

U.S. PATENT DOCUMENTS

| | | |
|---|---|---|
| 6,203,093 B1 | 3/2001 | Suzuki et al. |
| 6,298,943 B1 * | 10/2001 | Yamada et al. ............... 181/156 |
| 6,637,763 B2 | 10/2003 | Kuo |
| 6,647,121 B2 | 11/2003 | Stanberry et al. |
| 6,783,040 B2 | 8/2004 | Batchelor |
| 6,876,752 B1 * | 4/2005 | Guenther ....................... 381/386 |
| 7,390,969 B2 * | 6/2008 | Fraley et al. ................. 174/72 A |
| 7,397,405 B2 | 7/2008 | Yamada et al. |
| 7,596,448 B2 | 9/2009 | Suzuki et al. |
| D603,760 S | 11/2009 | Gregory |
| D615,908 S | 5/2010 | Ditterline |
| 7,742,615 B1 | 6/2010 | Lopez |
| 2001/0027896 A1 | 10/2001 | Reus |
| 2005/0121935 A1 | 6/2005 | Bell |
| 2005/0265566 A1 | 12/2005 | Suzuki et al. |
| 2007/0291957 A1 | 12/2007 | Khan |
| 2008/0128190 A1 | 6/2008 | Tsutsumi et al. |
| 2009/0154757 A1 | 6/2009 | Omoda et al. |
| 2009/0296956 A1 | 12/2009 | Gregory |

FOREIGN PATENT DOCUMENTS

| | | |
|---|---|---|
| EP | 1944227 A1 | 6/2008 |
| EP | 1944226 A1 | 7/2008 |
| JP | 2000118466 A | 4/2000 |
| JP | 2006254396 A | 9/2006 |

\* cited by examiner

MOTORCYCLE SPEAKER SYSTEM

BACKGROUND

The present invention relates to audio systems for motorcycles. More particularly, the invention relates to a motorcycle speaker arrangement with improved bass response.

Many motorcycle riders, especially those that ride touring motorcycles to travel long distances, prefer to have their motorcycles equipped with an audio system to provide music or another type of audio entertainment during the ride. To this end, original equipment and accessory audio systems have been available on the market for many years. However, some inherent drawbacks are faced by motorcycle audio systems. One drawback is that the substantially open-air atmosphere and significant traveling wind can make it more difficult for a rider to hear the output of the speakers. Additionally, space on a motorcycle is very limited, and therefore practical limits exist on the size of speakers and enclosures that can be mounted. These and other constraints make it difficult to provide high quality sound reproduction with satisfactory low frequency (bass) response.

SUMMARY

In one embodiment, the invention provides a motorcycle having an open-air cockpit area and a seat configured to receive a rider and position the rider within the open-air cockpit area. A luggage container defines a substantially enclosed cargo volume, and the luggage container is configured to open to provide selective access to the cargo volume. A speaker is configured to output sound in response to signals from a source. A speaker enclosure at least partially encloses the speaker. A bass-reflex passage couples an interior space of the speaker enclosure and the cargo volume of the luggage container.

In another embodiment, the invention provides a motorcycle including a rigid trunk having a substantially enclosed cargo volume. A speaker is configured to output sound in response to signals from a source. A speaker enclosure at least partially enclosing the speaker is positioned on an external surface of the trunk. A bass-reflex passage couples an interior space of the speaker enclosure and the cargo volume of the trunk.

In yet another embodiment, the invention provides a motorcycle having an open-air cockpit area and a seat configured to receive a rider and position the rider within the open-air cockpit area. A rigid trunk is positioned rearward of the open-air cockpit area and defines a substantially enclosed cargo volume. The trunk has a hinged lid configured to open to provide selective access to the cargo volume. A pair of speakers are configured to output sound in response to signals from a source. A left speaker enclosure is positioned on a left external side of the trunk and at least partially encloses a first one of the pair of speakers. A right speaker enclosure is positioned on a right external side of the trunk and at least partially encloses a second one of the pair of speakers. A first bass-reflex passage provides direct communication between an interior space of the left speaker enclosure and the cargo volume of the trunk. A second bass-reflex passage provides direct communication between an interior of the right speaker enclosure and the cargo volume of the trunk.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
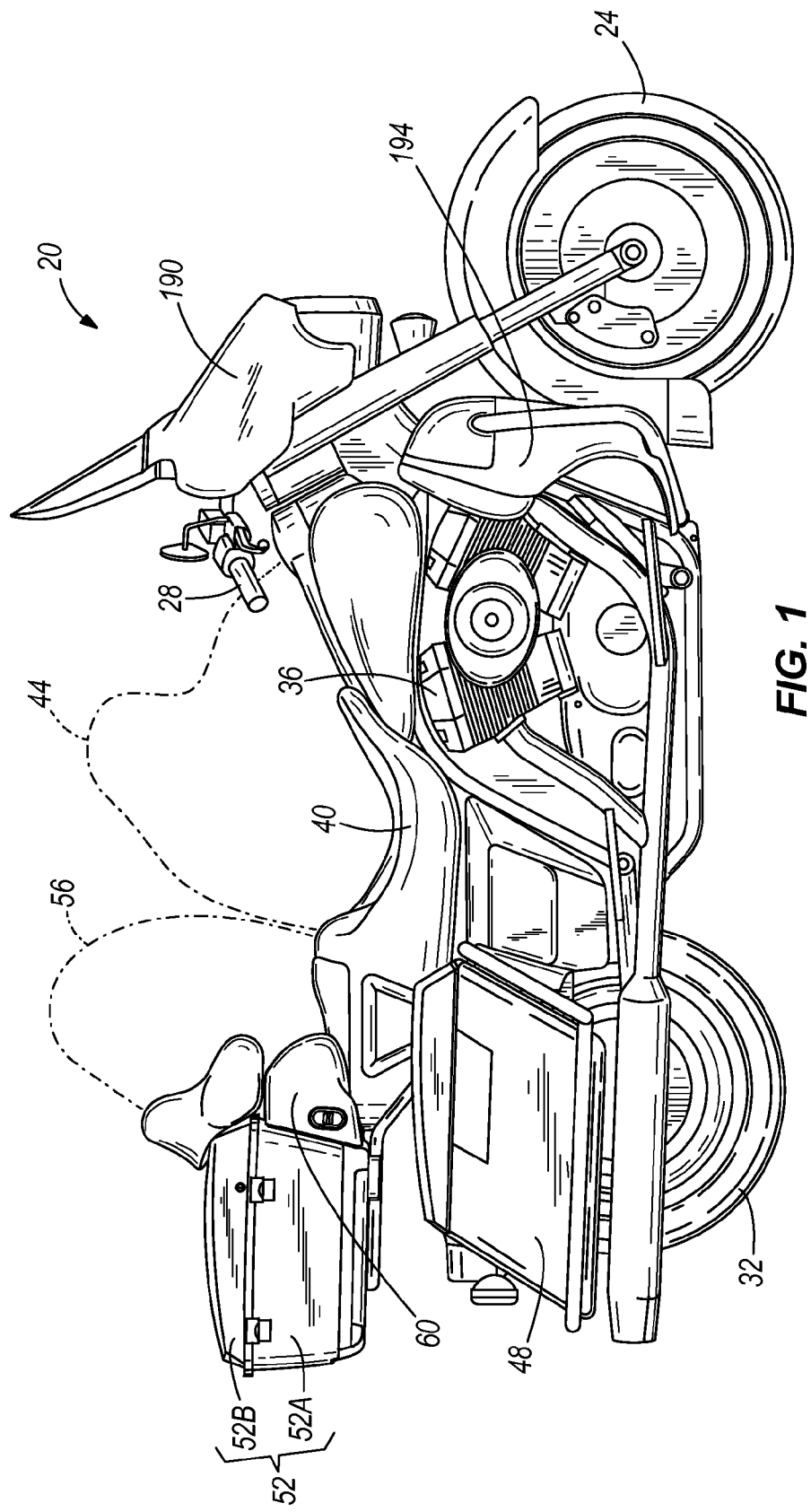
FIG. 1 is a side view of a motorcycle having a luggage container with integrated speakers.
Figure 2:
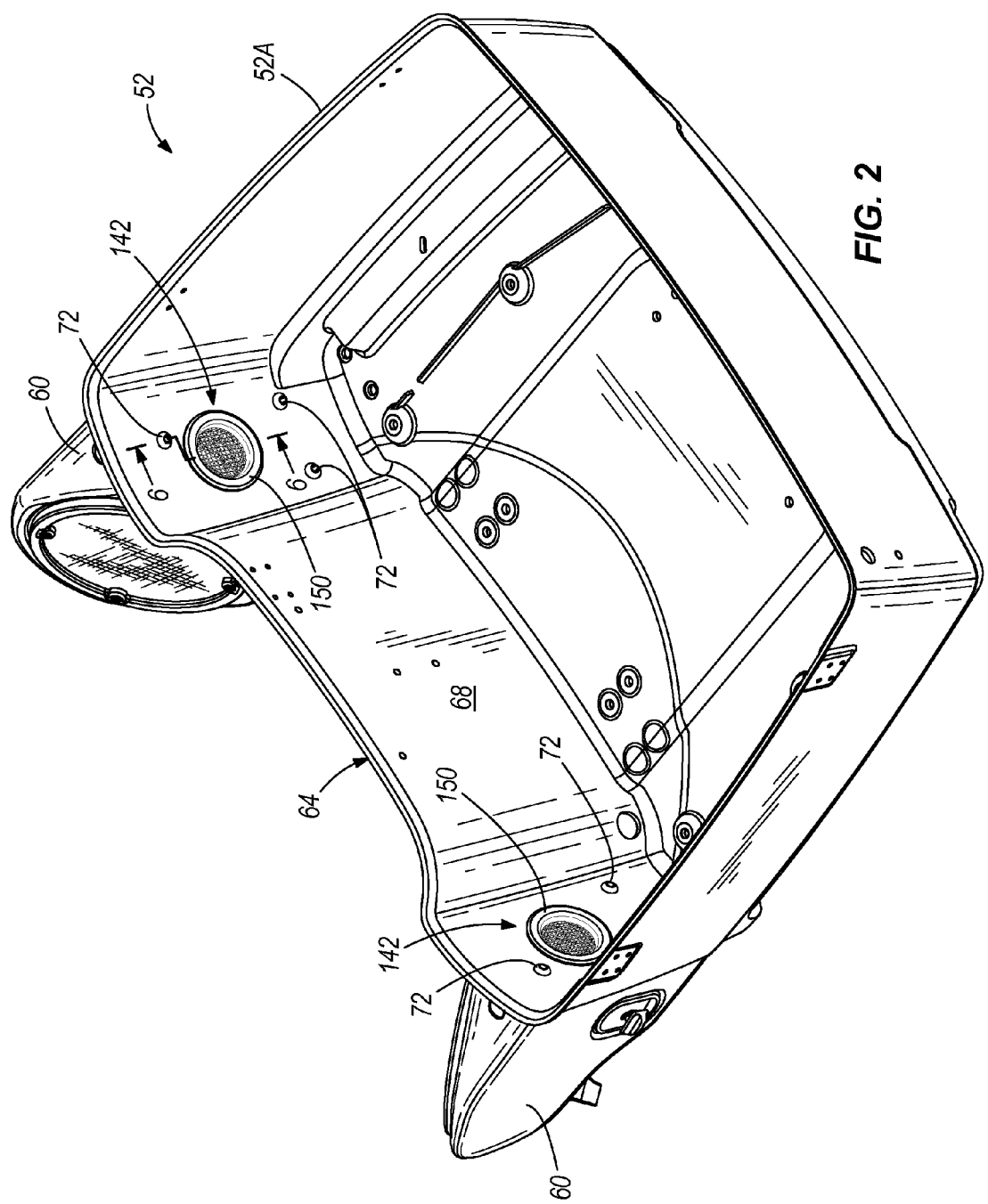
FIG. 2 is a perspective view of an interior of the luggage container of FIG. 1.
Figure 4:
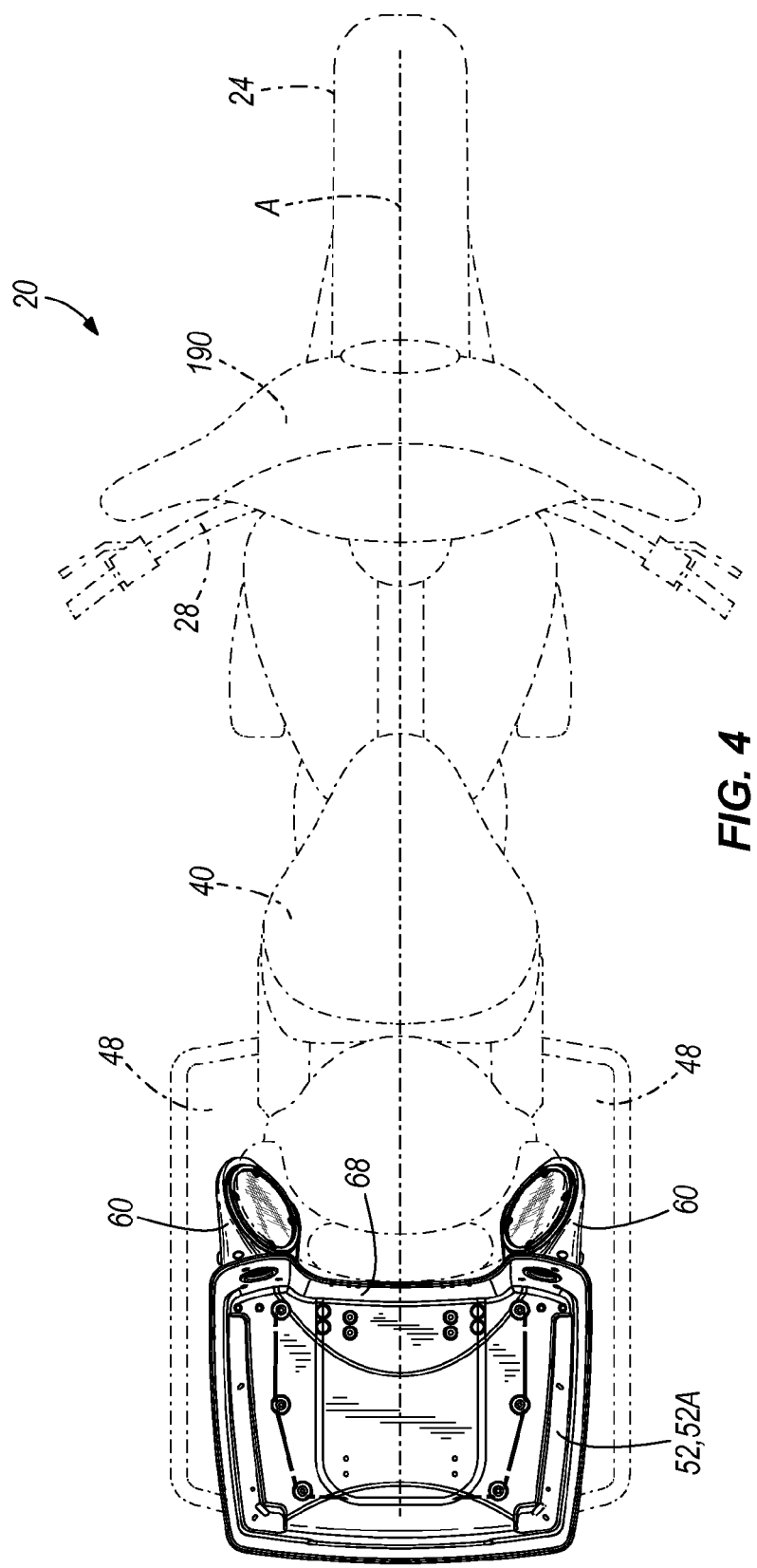
FIG. 4 is a top view of the luggage container of FIG. 1, with the motorcycle illustrated in phantom lines.

FIG. 1 illustrates a motorcycle 20 including a front wheel 24 steerable by a handle bar 28 and a rear wheel 32 propelled by an engine 36. The motorcycle 20 includes a seat 40 that positions a seated rider in an open-air cockpit 44 for operating the motorcycle 20. Although the basic configuration of the illustrated motorcycle 20 is traditional, many aspects of the invention described in detail below are not dependent upon a traditional configuration and can be used with motorcycles of various other configurations including for example, those with two front wheels or two rear wheels. The illustrated motorcycle 20 is a touring style motorcycle and includes various luggage containers including a pair of saddlebags 48 positioned alongside left and right sides of the rear wheel 32 as well as a trunk 52 positioned rearward of the cockpit 44 along the motorcycle's longitudinal axis or centerline A (FIG. 4). In the illustrated construction, the trunk 52 is a Harley-Davidson TOUR-PAK® and is positioned directly behind a passenger-accommodating area 56 of the motorcycle 20. However, it should be appreciated that many of the features described in detail below are not limited to use with a Harley-Davidson TOUR-PAK® and can be used with various motorcycle trunks or top cases.

Both the saddlebags 48 and the trunk 52 are constructed of rigid materials, such as plastic, fiberglass, etc. This is commonly known as "hard luggage" as opposed to "soft luggage", which generally is constructed of leather, nylon, or other textiles and is generally compressible as opposed to hard luggage, which provides inherent rigidity. The illustrated trunk 52 includes a body 52A and a lid 52B that are coupled together with hinges. One or more latches are used to retain the lid 52B in a closed position with respect to the body 52A. When unlatched, the lid 52B opens to provide selective access to a cargo volume jointly defined by the body 52A and the lid 52B.

Figure 3:
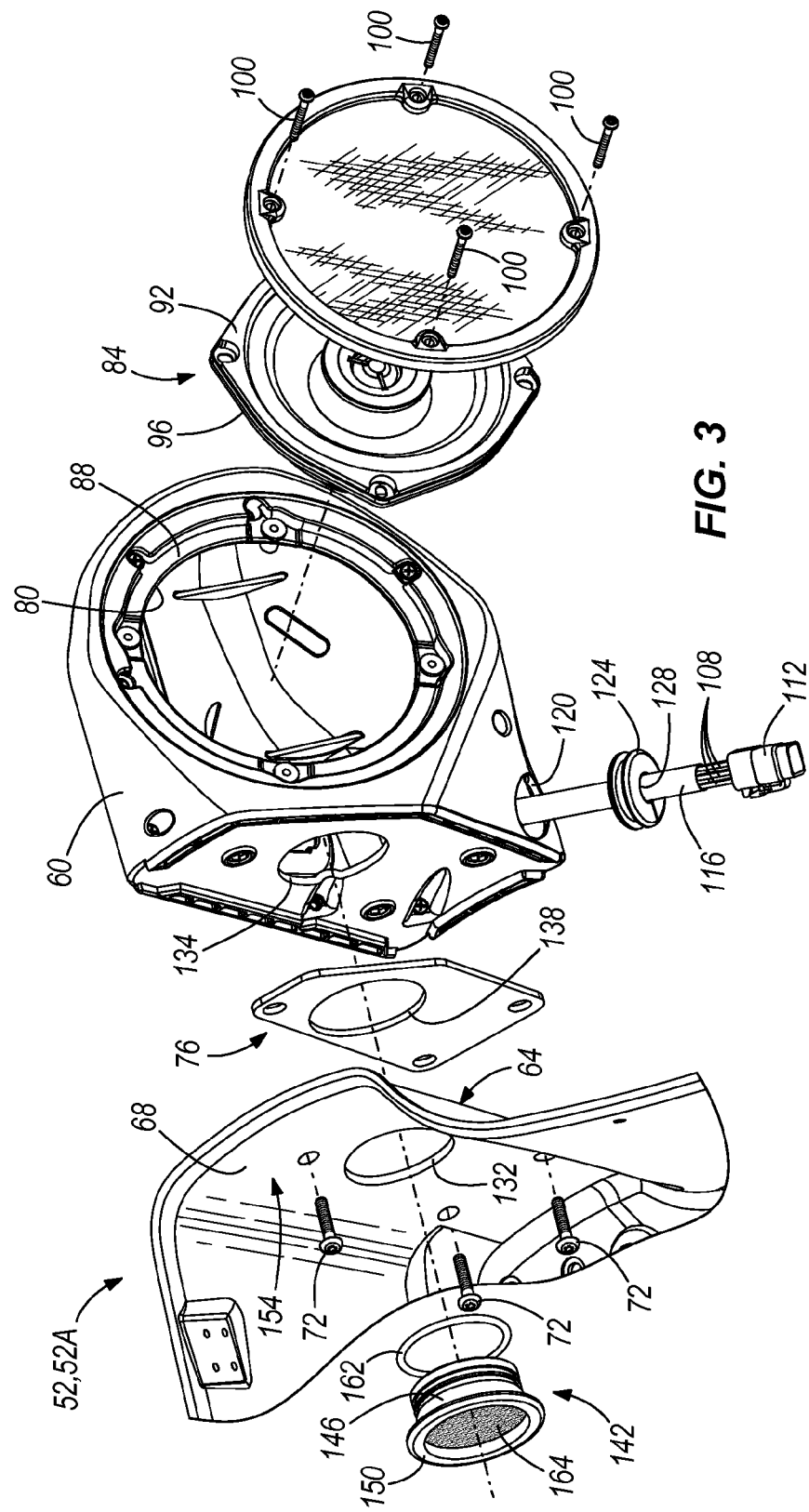
FIG. 3 is an exploded assembly view of the luggage container of FIG. 1.

Speaker enclosures 60 are positioned at each lateral side of the trunk 52. As shown in FIG. 3, each speaker enclosure 60 is positioned on an external surface 64 of a side wall 68 of the trunk 52 and coupled to the side wall 68 with three fasteners 72. In the illustrated construction, the side wall 68 is a front side wall of the trunk 52, but one or more speaker enclosures can also be coupled to other side walls or other portions of the trunk 52. Only one of the speaker enclosures 60 is shown in FIG. 3, but it should be understood that the other speaker enclosure 60 (and associated components) are formed as a mirror image. In the illustrated construction, a gasket 76 is positioned between the inboard side of the speaker enclosure 60 and the external surface 64 of the trunk 52. The gasket 76 may be constructed of a suitable material, such as closed-cell foam, to provide an air-tight and water-tight seal when compressed between the speaker enclosure 60 and the external surface 64 of the trunk 52. Although the illustrated construction places the speaker enclosures 60 on the side walls 68 of the trunk 52, the speaker enclosures 60 may be positioned at other locations on the trunk 52 or additional speaker enclosures may be coupled to the trunk 52 in addition to the illustrated speaker enclosures 60.

Each speaker enclosure 60 includes a speaker-receiving opening 80 into which a speaker 84 is received. In the illustrated construction, each speaker enclosure 60 receives a single speaker 84, but alternate arrangements may be substituted. The speaker enclosure 60 includes a ridge 88 at the speaker-receiving opening 80 that receives an outer flange 92 of the speaker 84. As shown in FIG. 3, a gasket 96 is positioned between the ridge 88 and the outer speaker flange 92. The gasket 96 provides an air-tight and water-tight seal between the speaker 84 and the speaker enclosure 60 when compressed therebetween. Four fasteners 100 are used to couple the outer speaker flange 92 to the ridge 88, thus mounting the speaker 84 in the speaker enclosure 60. The speaker 84 is substantially enclosed within the interior of the speaker enclosure 60 with the front side of the speaker 84 directed at a desired outward angle.

With continued reference to FIG. 3, electrical wires 108 are used to connect the speaker 84 to a source (not shown), such as a music player or other audio output device that sends electrical signals to drive the speakers 84. It should also be appreciated that the speakers 84 may be configured to receive signals and operate wirelessly. The electrical wires 108 are bundled and terminate in a harness 112 for ease of connectivity. Although described above as being configured for an external source, the speaker enclosure 60 can be provided with an internal source in addition to or instead of an external source if desired. The bundled wires 108 are covered in a wrap 116 and extend through an aperture 120 in the speaker enclosure 60 so that the wires 108 can be connected on one end to the rear side of the speaker 84 within the speaker enclosure 60 and on the other end to a source which is external to the speaker housing 60. The wiring aperture 120 of the speaker enclosure 60 receives a form-fitting grommet 124 (e.g., a split-ring grommet). The grommet 124 has an aperture 128 in which the bundled and wrapped electrical wires 108 are form-fittingly received. Because the bundled and wrapped electrical wires 108 are tightly received within the grommet 124, and the grommet 124 is tightly received within the wiring aperture 120 of the speaker enclosure 60, the wiring aperture 120 is substantially sealed from the undesirable outward leakage of air during speaker operation and the undesirable inward seepage of water from the environment.

To enhance particularly the low frequency response of the speaker 84, the speaker enclosure 60 is "ported". More specifically, a bass-reflex passage is provided between the interior space of the speaker enclosure 60 and the cargo volume of the trunk 52 via cooperating apertures 132, 134 formed in the side wall 68 of the trunk 52 and the speaker enclosure 60, respectively. Although not required in all constructions, the apertures 132, 134 have substantially the same shape (i.e., circular) and size. In some constructions, the apertures 132, 134 are about 2.0 inches in diameter. In the illustrated construction, the gasket 76 between the speaker enclosure 60 and the external surface 64 of the trunk 52 is formed with a corresponding aperture 138 that is about the same size and shape as (or slightly larger than) the apertures 132, 134.

Figure 6:
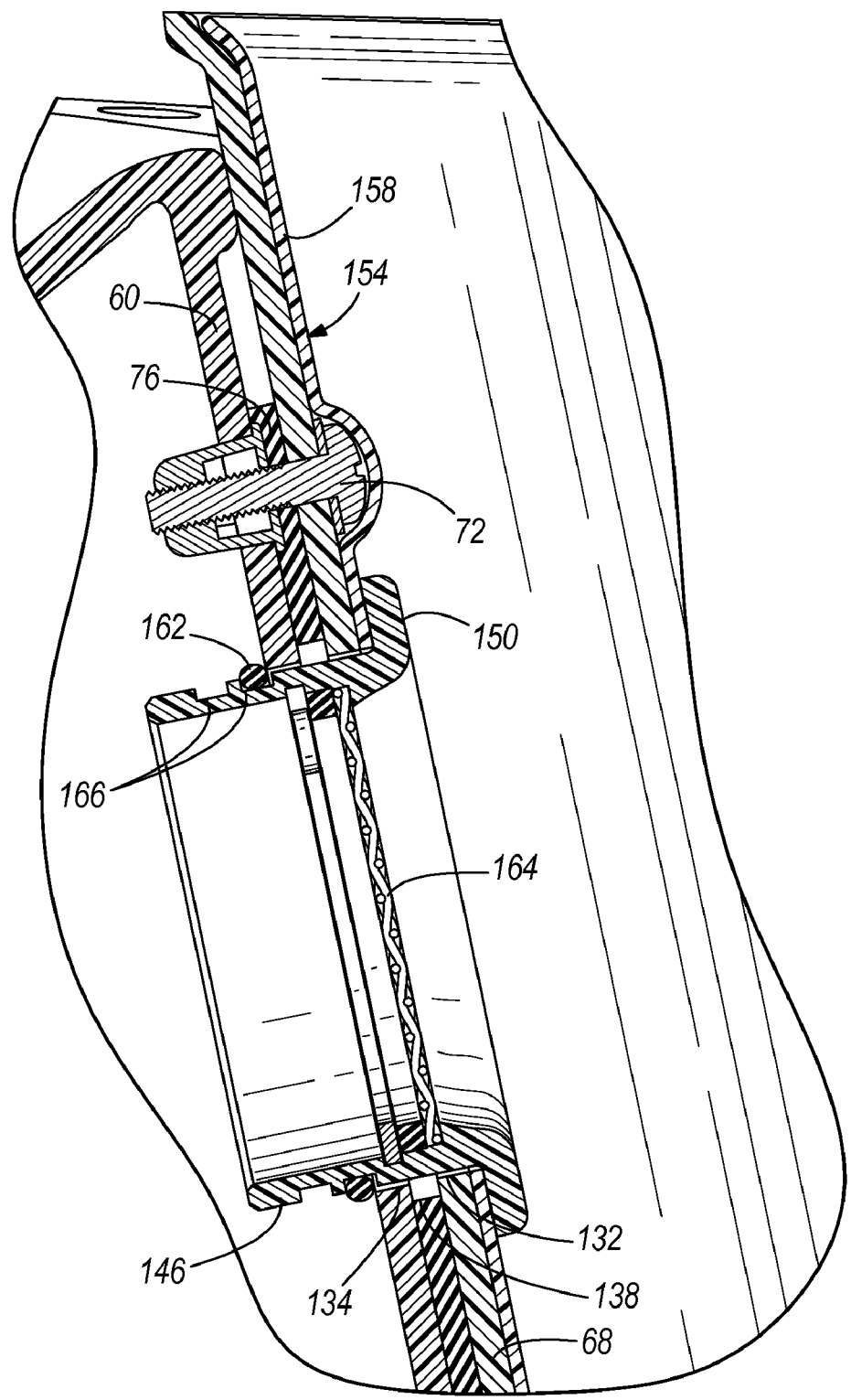
FIG. 6 is a cross-sectional view of a bass-reflex passage between the cargo volume of the luggage container and the interior space of the speaker enclosure, taken along line 6-6 of FIG. 2.

A hollow port 142 is positioned to establish direct communication between the interior space of the speaker enclosure 60 and the cargo volume of the trunk 52. By "direct" it is meant that air or a sound pressure wave in air may pass between the interior space of the speaker enclosure 60 and the cargo volume of the trunk 52 without passing into the outside atmosphere or an interior space of any other component. In the illustrated construction, the hollow port 142 is generally cylindrical or tubular and includes a tubular shank 146 and an enlarged end flange 150. The flange 150 is configured to abut an interior surface 154 of the trunk 52. As shown in FIG. 6, the interior surface 154 is provided by a trunk liner 158 (the liner 158 is removed for clarity in the remaining figures). The liner 158 is sandwiched between the trunk side wall 68 and the flange 150 of the hollow port 142 in the illustrated construction. Alternately, the end flange 150 of the hollow port 142 may directly abut the side wall 68 of the trunk 52.

The hollow port 142 is configured to be assembled by inserting from the interior side of the trunk 52 through the liner 158, through the aperture 132 in the side wall 68 of the trunk 52, through the aperture 138 in the gasket 76, and through the aperture 134 in the speaker enclosure 60. A snap-fit is enabled by a resilient ring 162 positioned on the shank 146 of the hollow port 142. The resilient ring 162 has an outer diameter exceeding the diameters of the apertures 132, 134 so that interference is present. The interference is overcome by compressing the resilient ring 162 radially inward when the hollow port 142 is inserted. Once the resilient ring 162 is pressed through the aperture 134 in the speaker enclosure 60, the resilient ring 162 resiliently returns to its original form and holds the hollow port 142 from incidental disassembly. A screen 164 is positioned to extend across the hollow port 142 adjacent the end flange 150. The screen 164 allows substantially free passage of air while preventing small objects (e.g., coins, etc.) within the trunk 52 from matriculating into the speaker enclosures 60.

Figure 5:
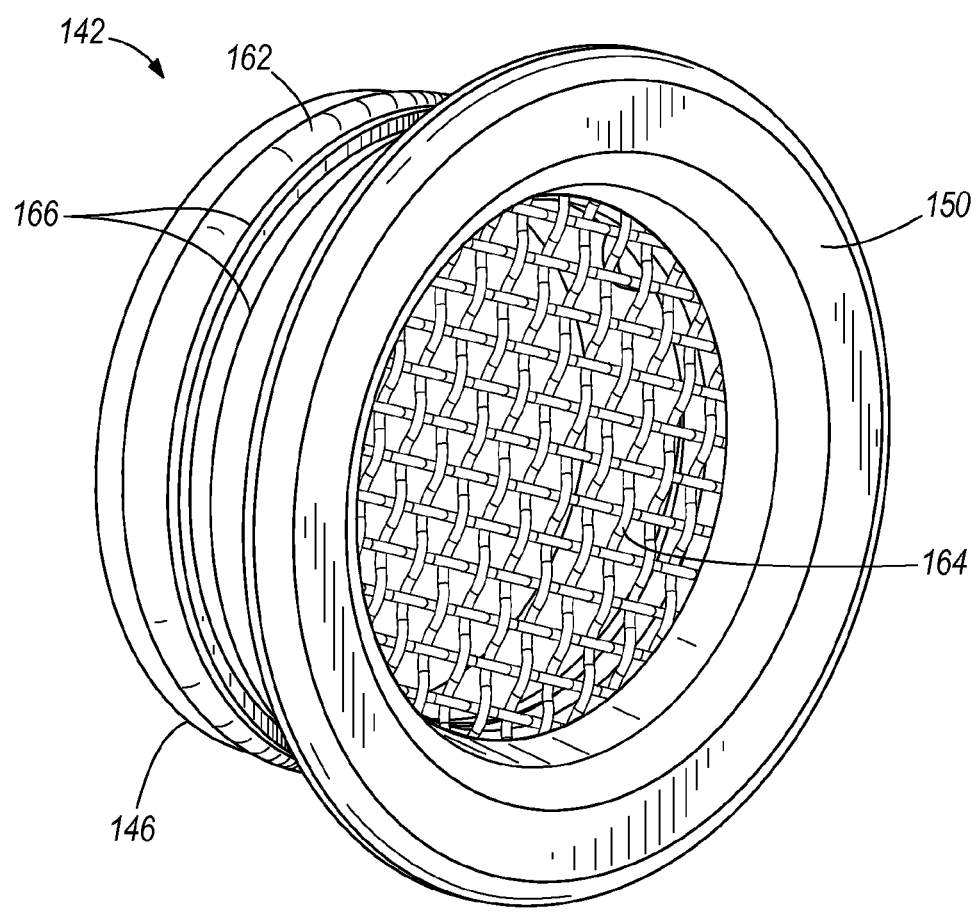
FIG. 5 is a perspective view of a hollow port for coupling the interior space of a speaker enclosure with the cargo volume of the luggage container.

As shown in FIGS. 5 and 6, the shank 146 is formed with two axially-spaced channels 166. Each of the channels 166 extends circumferentially about the shank 146 and is configured to receive and position the resilient ring 162 at a particular distance from the enlarged flange 150. The resilient ring 162 can be moved between the two channels 166 to reconfigure the hollow port 142 to provide a suitable fit when used with the illustrated liner 158 or an alternate liner having a different thickness (or to provide a suitable fit when used with or without the liner 158). Thus, the same hollow port 142 is easily reconfigurable by repositioning the resilient ring 162 to accommodate different liner configurations inside the trunk 52.

Although the hollow port 142 is illustrated as being substantially tubular, the port can have alternate cross-sectional shapes including round (e.g., ovate, elliptical, etc.), angular (triangular, rectangular, etc.), or irregular cross-sectional shapes. Furthermore, the establishment of a bass-reflex passage, whether direct or indirect, is not dependent upon a dedicated port member (i.e., hollow port 142) being provided. For example, the speaker enclosure 60 or the side wall 68 of the trunk 52 may be provided with a hollow protruding portion at the corresponding aperture 132, 134 configured to extend into the aperture 132, 134 of the other, or the apertures 132, 134 in the trunk 52 and the speaker enclosure 60 may themselves establish the bass-reflex passage. Regardless of whether or not a dedicated port member is used, it should also be noted that more than one passage may establish direct communication between the interior space of each speaker enclosure 60 and the cargo volume of the trunk 52 to provide a desired bass-reflex effect.

Figure 7:
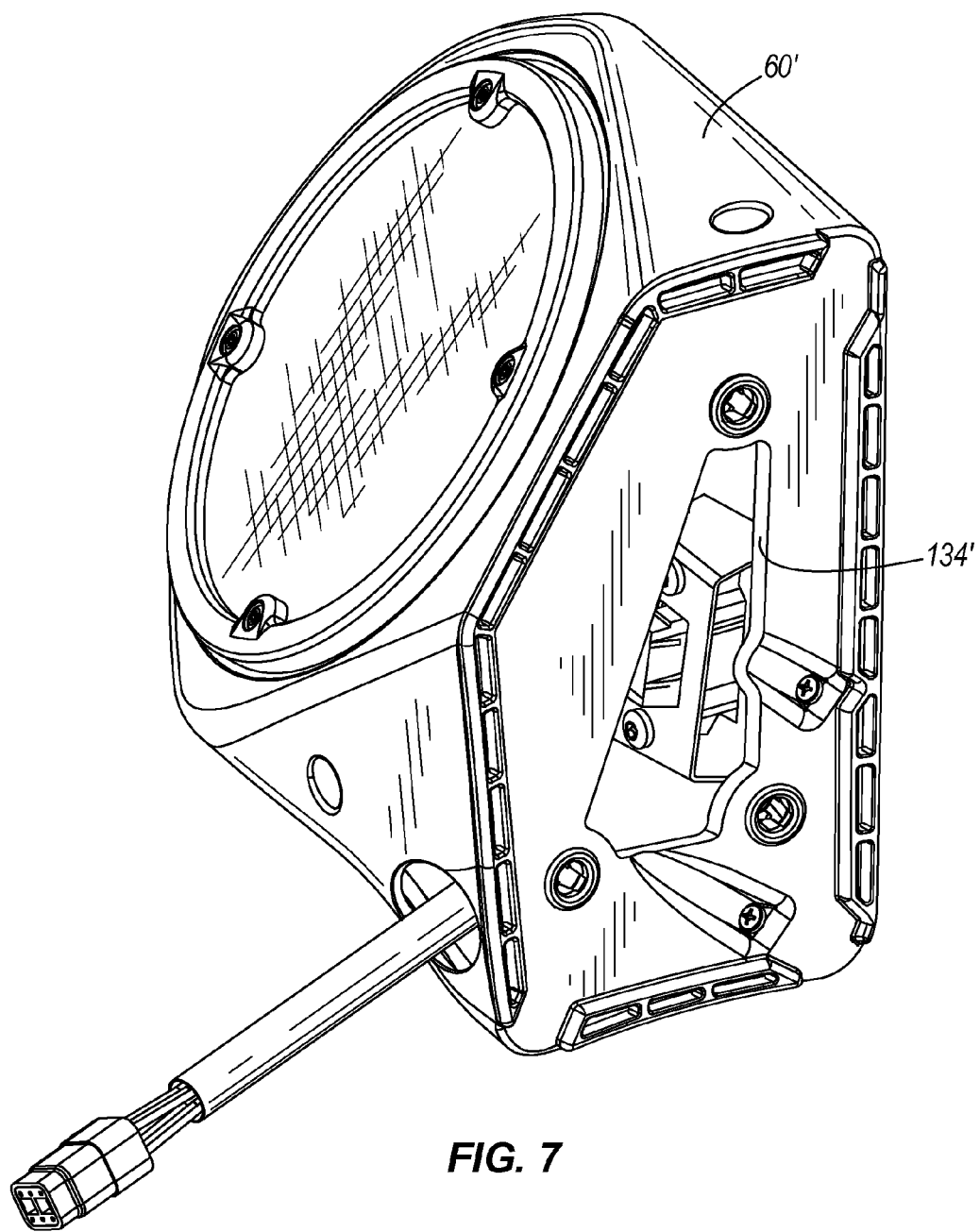
FIG. 7 is a perspective view of an alternate speaker enclosure having an irregularly shaped aperture for establishing a bass-reflex passage.
Figure 8:
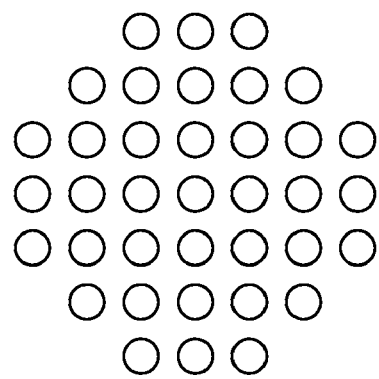
FIGS. 8-10 illustrate several multi-aperture patterns for bass-reflex passages.
Figure 9:
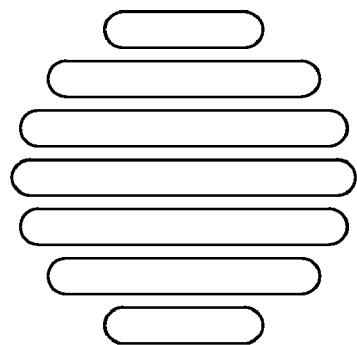
Figure 10:
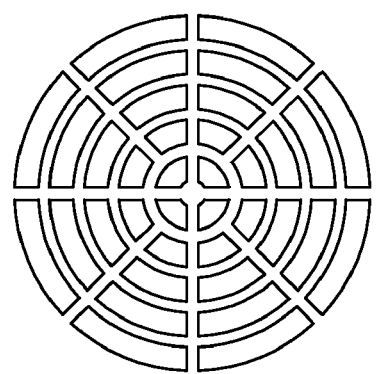

FIG. 7 illustrates an alternate speaker enclosure 60' including an aperture 134' that is irregular in shape and substantially larger than the aperture 134 shown in FIG. 6. The aperture 134' may match apertures in the side wall 68 of the trunk 52 and the liner 158 and may receive a similarly-shaped hollow port (not shown). However, in some constructions, at least one of the trunk 52 and the liner 158 may include an array of smaller apertures generally corresponding to the large, irregular aperture 134'. In some such constructions, no hollow port member is used. FIGS. 8-10 illustrate various exemplary patterns of small apertures that generally correspond to the circular aperture 134 of the speaker enclosure 60. For example, apertures according to one of the illustrated patterns may be provided in both the side wall 68 of the trunk 52 and the liner 158 to cooperate with the aperture 134 to establish direct communication between the interior space of the speaker enclosure 60 and the cargo volume of the trunk 52. Furthermore, the aperture 134 in the speaker enclosure 60 can also be replaced by a pattern of small apertures corresponding to those in the trunk 52 and the liner 158, although this may complicate the assembly by requiring greater positional accuracy between the speaker enclosure 60 and the trunk 52. Although FIGS. 8-10 illustrate particular patterns of circular holes, horizontal slots, and segmented circumferential slots of various diameters, alternate aperture patterns may be provided. The frequency response of the speaker 84 is tuned for a particular frequency response characteristic (e.g., a boost in sound pressure level over a particular frequency range) by the particular size and configuration of the passage(s) establishing communication between the interior space of the speaker enclosure 60 and the cargo volume of the trunk 52.

By providing the direct communication between the interior space of the speaker enclosures 60 and the cargo volume of the trunk 52, the sound pressure generated by the speakers 84 is allowed to reverberate through a significantly larger space than that provided by the speaker enclosures 60 alone. Meanwhile, the speaker enclosure-sealing components (i.e., the gaskets 76, 96 and the grommet 124) act to maximize the effective sound pressure by minimizing sound pressure leakage out of the speaker enclosures 60. The sealing of the speaker enclosures 60 works in combination with the bass-reflex passage to markedly improve the low frequency ("bass") response of the speakers 84 while reducing total harmonic distortion. For example, between about 50 Hz and about 200 Hz, the sound pressure level is increased by about 5-10 dB while the total harmonic distortion over the same frequency range is reduced from about 15-30 percent down to about 1-5 percent. Thus, not only is the sound level from the speakers 84 increased at the low frequencies, but the overall sound quality is improved.

While the trunk 52 is a convenient location for mounting the speaker enclosures 60 as described above, features and aspects of the arrangement described above can be adapted to speaker enclosures positioned on any luggage container provided on the motorcycle 20. For example, speaker enclosures similar to the speaker enclosures 60 can be positioned on external surfaces of the saddlebags 48. The interior space of such speaker enclosures can be substantially sealed from the environment and provided direct communication to a cargo space within the respective saddlebags 48 by a bass-reflex passage as described above. Likewise, one or more speaker enclosures can be positioned on glovebox-type luggage containers provided either in a cowl area (generally inside a 190 of the motorcycle 20) or in leg shields or "lowers" 194 (FIG. 1). The interior space of such a speaker enclosure can be substantially sealed from the environment and provided direct communication to a cargo space within the corresponding glovebox-type container by a bass-reflex passage as described above.

Various features and advantages of the invention are set forth in the following claims.

What is claimed is:

1. A motorcycle comprising:
  an open-air cockpit area;
  a seat configured to receive a rider and position the rider within the open-air cockpit area;
  a luggage container defining a substantially enclosed cargo volume, the luggage container being configured to open to provide selective access to the cargo volume;
  a speaker configured to output sound in response to signals from a source;
  a speaker enclosure at least partially enclosing the speaker; and
  a bass-reflex passage directly coupling an interior space of the speaker enclosure and the cargo volume of the luggage container.

2. The motorcycle of claim 1, wherein the luggage container is a trunk positioned rearward of the open-air cockpit area along a longitudinal centerline of the motorcycle above a rear fender.

3. The motorcycle of claim 1, wherein the luggage container has rigid walls.

4. The motorcycle of claim 1, wherein the speaker enclosure is positioned on an external surface of the luggage container, the motorcycle further comprising a gasket compressed between the speaker enclosure and the external surface of the luggage container at the bass-reflex passage.

5. The motorcycle of claim 1, further comprising a gasket compressed between an outer flange of the speaker and a speaker-receiving opening of the speaker enclosure.

6. The motorcycle of claim 1, further comprising a wrapped wire bundle coupled to the speaker and extending through an aperture in the speaker enclosure, the aperture receiving a form-fitting grommet having an aperture that receives the wrapped wire bundle in a form-fitting manner.

7. The motorcycle of claim 1, wherein the bass-reflex passage is established by a hollow port extending through and being snap-fit into a pair of apertures, one of the pair of apertures being provided in each of the speaker enclosure and the luggage container.

8. The motorcycle of claim 7, further comprising a screen positioned in the hollow port.

9. The motorcycle of claim 7, further comprising a resilient ring mounted on an outside of the hollow port to create the interference for the snap-fit, the resilient ring being movable between two axially-spaced channels in the hollow port to accommodate a thickness variation presented by different liner configurations inside the luggage container.

10. The motorcycle of claim 1, wherein the speaker enclosure, the speaker, and the bass-reflex passage are provided on one lateral side of the luggage container, and a second speaker enclosure, a second speaker, and second bass-reflex passage are provided in substantially identical arrangement on an opposite lateral side of the luggage container.

11. A motorcycle comprising:
  a rigid trunk having a substantially enclosed cargo volume;
  a speaker configured to output sound in response to signals from a source;

a speaker enclosure at least partially enclosing the speaker, the speaker enclosure being positioned on an external surface of the trunk; and a bass-reflex passage coupling an interior space of the speaker enclosure and the cargo volume of the trunk.

12. The motorcycle of claim 11, wherein the trunk includes a hinged lid for selectively providing access to the cargo volume.

13. The motorcycle of claim 11, further comprising a wrapped wire bundle coupled to the speaker and extending through an aperture in the speaker enclosure, the aperture receiving a form-fitting grommet having an aperture that receives the wrapped wire bundle in a form-fitting manner.

14. The motorcycle of claim 11, wherein the bass-reflex passage is established by a hollow port extending through and being snap-fit into a pair of apertures, one of the pair of apertures being provided in each of the speaker enclosure and the trunk.

15. The motorcycle of claim 14, further comprising a screen positioned in the hollow port.

16. The motorcycle of claim 14, further comprising a resilient ring mounted on an outside of the hollow port to create the interference for the snap-fit, the resilient ring being movable between two axially-spaced channels in the hollow port to accommodate a thickness variation presented by different liner configurations inside the trunk.

17. The motorcycle of claim 11, wherein the speaker enclosure, the speaker, and the bass-reflex port are provided on one lateral side of the trunk, and a second speaker enclosure, a second speaker, and second bass-reflex passage are provided in substantially identical arrangement on an opposite lateral side of the trunk.

18. The motorcycle of claim 11, further comprising a gasket compressed between the speaker enclosure and the external surface of the trunk at the bass-reflex passage.

19. The motorcycle of claim 11, further comprising a gasket compressed between an outer flange of the speaker and a speaker-receiving opening of the speaker enclosure.

20. A motorcycle comprising:
an open-air cockpit area;
a seat configured to receive a rider and position the rider within the open-air cockpit area;
a rigid trunk positioned rearward of the open-air cockpit area and defining a substantially enclosed cargo volume, the trunk having a hinged lid configured to open to provide selective access to the cargo volume;
a pair of speakers configured to output sound in response to signals from a source;
a left speaker enclosure positioned on a left external side of the trunk and at least partially enclosing a first one of the pair of speakers;
a right speaker enclosure positioned on a right external side of the trunk and at least partially enclosing a second one of the pair of speakers;
a first bass-reflex passage providing direct communication between an interior space of the left speaker enclosure and the cargo volume of the trunk; and
a second bass-reflex passage providing direct communication between an interior space of the right speaker enclosure and the cargo volume of the trunk.

21. The motorcycle of claim 20, wherein each of the first and second bass-reflex passages is established by a corresponding hollow port extending through and being snap-fit into a pair of apertures, one of the pair of apertures being provided in each of the speaker enclosure and the trunk.

22. The motorcycle of claim 21, further comprising a resilient ring mounted on an outside of each of the hollow ports to create the interference for the snap-fit, the resilient ring being movable between two axially-spaced channels in the hollow port to accommodate a thickness variation presented by different liner configurations inside the trunk.

23. The motorcycle of claim 20, wherein each of the left and right speaker enclosures includes a speaker-receiving aperture and a wiring aperture, and both the speaker-receiving aperture and the wiring aperture of each speaker enclosure is sealed with a gasket to direct substantially all airflow in and out of the speaker enclosure through the bass-reflex passage.

* * * * *